J. W. GOLDEN.
FLOWER HOLDER.
APPLICATION FILED MAY 12, 1910.
1,016,822.
Patented Feb. 6, 1912.
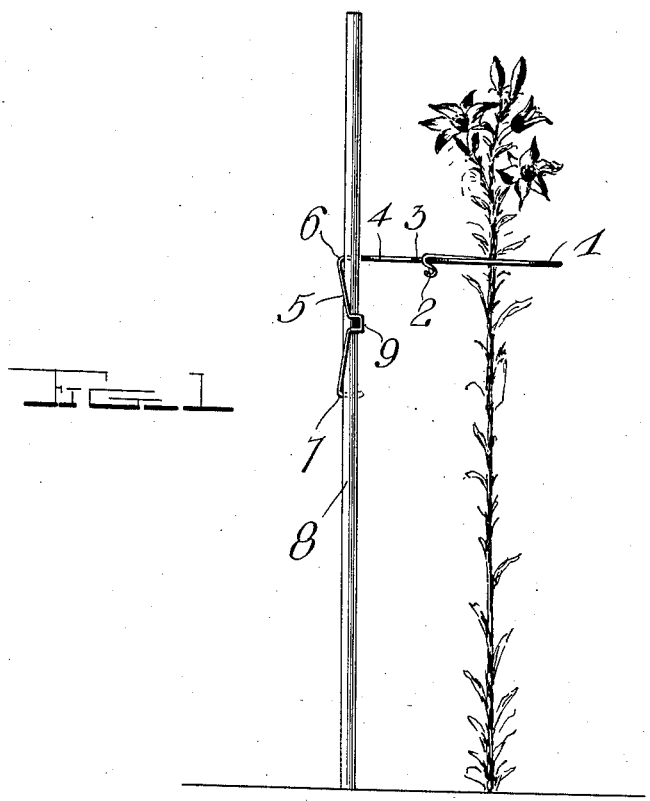
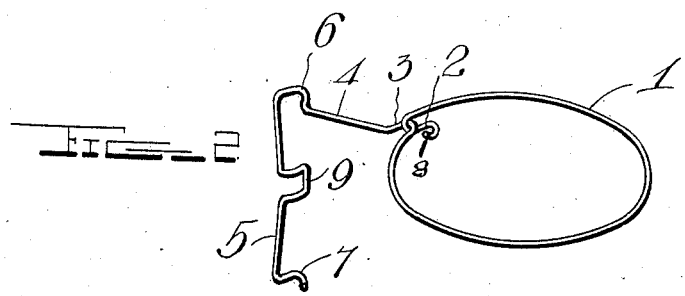
Witnesses
Inventor
J. W. Golden
by
Attorneys

UNITED STATES PATENT OFFICE.

JOHN W. GOLDEN, OF JOHNSTOWN, PENNSYLVANIA.

FLOWER-HOLDER.

1,016,822.  Specification of Letters Patent.  Patented Feb. 6, 1912.

Application filed May 12, 1910. Serial No. 560,949.

*To all whom it may concern:*

Be it known that I, JOHN W. GOLDEN, a citizen of the United States, residing at Johnstown, in the county of Cambria and State of Pennsylvania, have invented certain new and useful Improvements in Flower-Holders; and I do declare the following to be a full, clear, and exact description of the invention, such as will enable others skilled in the art to which it appertains to make and use the same.

This invention relates to an improved support for plants, flowers and the like.

The object of the invention is to provide a simply constructed device for use in supporting any kind of flowers and plants without injuring or disturbing the roots thereof.

With the foregoing and other objects in view, the invention consists of certain novel features of construction, combination and arrangement of parts as will be more fully described and particularly pointed out in the appended claim.

In the accompanying drawings, Figure 1 is a side elevation of this device applied. Fig. 2 is a perspective view of the device detached.

In the embodiment illustrated a flower engaging member is shown in the form of an annular member 1, preferably composed of a piece of wire having one end thereof bent to form a hook 2, which is designed to detachably engage a loop 3 formed in said wire to provide the ring shaped member which encircles the stems of the flower to be supported said hook having a bend 8 on its terminal so that the hook can engage or disengage the loop of the ring without injury to the fingers. An arm 4 extends laterally from the loop 3 in outward direction and is shown bent downwardly at right angles to form a stake engaging member 5. This stake engaging member 5 is provided at its opposite ends with lateral depressions or loops 6 and 7 which are designed to engage one side of the stake 8, as shown in Fig. 1. The stake engaging portion 5 of the wire is formed intermediate of its ends with a U-shaped extension 9 which is bent or curved in an opposite direction to the loops 6 and 7 and is adapted to engage upon the opposite side of the stake to said loops, as clearly shown in Fig. 1. The member 5 is extended at a slight angle from the extension 9 to the loops 6 and 7 and is closely engaged with the stake. The spring tension of these angular portions of the member 5 tends to force the central extension 9 outwardly and into clamping engagement with the stake.

It will be obvious that the formation of the stake engaging member at a point remote from the flower encircling loop, provides for the insertion of the stake into the ground at some distance from the roots of the flower to be supported, whereby all danger of puncturing the bulb or injuring the roots in any way is avoided.

From the foregoing description taken in connection with the accompanying drawings, the construction and operation of the invention will be readily understood without requiring a more extended explanation.

What I claim as new is:—

A flower holder comprising a single piece of wire bent at one portion of its length to provide a ring having a loop and hook thereon, said wire being bent laterally to provide an arm, said arm being bent vertically downwardly to provide a stake member having parallel U-shaped bends on the upper and lower ends to engage one side of the stake member, said stake member also having a reverse U-shape bend at its central portion to provide an intermediate holder to engage the other side of the stake member said hook of the ring having a bend on its terminal to prevent injury to the fingers when the hook is to be engaged or disengaged from the ring loop.

In testimony whereof I have hereunto set my hand in presence of two subscribing witnesses.

JOHN W. GOLDEN.

Witnesses:
GEORGE W. CONSTABLE,
NOAH CONSTABLE.

Copies of this patent may be obtained for five cents each, by addressing the "Commissioner of Patents, Washington, D. C."